United States Patent [19]
Kawano

[11] Patent Number: 5,311,299
[45] Date of Patent: May 10, 1994

[54] RECURSIVE COMB FILTER

[75] Inventor: Mitsumo Kawano, Saitama, Japan

[73] Assignee: Kabushiki Kaisha Toshiba, Kawasaki, Japan

[21] Appl. No.: 985,914

[22] Filed: Dec. 4, 1992

[30] Foreign Application Priority Data

Dec. 10, 1991 [JP]  Japan .................. 3-326023

[51] Int. Cl.$^5$ ............................................. H04N 05/213
[52] U.S. Cl. ..................................... 348/622; 348/624
[58] Field of Search ............... 358/36, 37, 31, 166, 358/167, 340, 336; H04N 5/213, 9/64

[56] References Cited

U.S. PATENT DOCUMENTS

| | | | |
|---|---|---|---|
| 4,682,251 | 7/1987 | Hirota et al. | 360/33.1 |
| 4,709,269 | 11/1987 | Ozaki | 358/167 |
| 4,748,498 | 5/1988 | Yamanishi et al. | 358/36 |
| 4,775,888 | 10/1988 | Nakagawa et al. | 358/105 |
| 4,885,639 | 12/1989 | Nakata et al. | 358/167 |
| 4,926,361 | 5/1990 | Ohtsubo et al. | 364/574 |
| 5,105,275 | 4/1992 | Iizuka et al. | 358/167 |

FOREIGN PATENT DOCUMENTS

| | | |
|---|---|---|
| 0234757 | 9/1987 | European Pat. Off. |
| 0440242 | 8/1991 | European Pat. Off. |

Primary Examiner—Victor R. Kostak
Assistant Examiner—Nathan J. Flynn
Attorney, Agent, or Firm—Cushman, Darby & Cushman

[57] ABSTRACT

A periodic input signal Sa is input into a first subtracter and is input on the other hand into a second subtracter, a difference signal Sb between the periodic input signal Sa and a signal Se obtained by delaying this signal by 1H is obtained in a second subtracter. This difference signal Sb is input into a first limiter amplifier having a specific gain factor and a second limiter amplifier having a smaller gain factor, the outputs of the first and second limiter amplifiers are input into a third subtracter. A signal Sc is obtained by subtracting the output of the second limiter amplifier from the output of the first limiter amplifier. This signal Sc is subtracted from the input signal Sa by the first subtracter to obtain a filter output Sd. Thereby, without using a non-correlation controlling switch, a tailing phenomenon by a large variation of a signal amplitude can be reduced most suitably, a noise suppressing operation is made in a minute signal, a tailing is suppressed in response to the signal variation amount in a medium signal and further, tailing can be substantially eliminated in a large amplitude signal.

5 Claims, 5 Drawing Sheets k : GAIN OF LIMITER AMPLIFIER 14
m : GAIN OF LIMITER AMPLIFIER 15
L : LIMIT LEVEL OF LIMITER AMPLIFIERS 14 AND 15
k>m, k-m=0.5 HERE k : GAIN OF LIMITER AMPLIFIER (HERE k=0.5)
L : LIMIT LEVEL OF LIMITER AMPLIFIER k : GAIN OF LIMITER AMPLIFIER ( HERE k=0.5 )
L : LIMIT LEVEL OF LIMITER AMPLIFIER

RECURSIVE COMB FILTER

BACKGROUND OF THE INVENTION

1. Field of the Invention

The present invention relates to a recursive comb filter to be used for a video signal processing circuit of a magnetic recording and reproducing apparatus or the like.

2. Description of the Related Art

One of the techniques of elevating the picture quality of a reproduced video signal is a technique of removing noises with a recursive comb filter by utilizing the line correlativity in the vertical direction of a video signal.

In the NTSC television system, a luminance signal has a line correlativity and is substantially the same signal in an adjacent one horizontal scanning period (abbreviated as 1H hereinafter). A chroma signal is displaced in the phase by 180 degrees per line and therefore the present signal as inverted in the phase and the present signal as delayed by 1H are substantially the same signal. The noise component included in a video signal is usually so small in the level that a small amplitude part having no line correlativity is considered to be a noise component, a technique of removing noises by subtracting it from the original signal is adopted and a chroma noise reduction (CNR) circuit in which is used a recursive comb filter provided with also a color irregularity suppressing effect is used particularly on chroma signals.

That is to say, as shown in FIG. 4, the above mentioned CNR circuit comprises a subtracter 2, subtracter 3, limiter amplifier 4, switch 5, 1H delaying circuit 6 and inverting amplifier 7.

A chroma signal Sa having a 1H line correlativity is fed as an input to an input terminal 1. The input signal Sa becomes a signal Sd through the subtracter 2 and is fed to an output terminal 8. The signal Sd is delayed by 1H by the 1H delaying circuit 6, is inverted in the phase by 180 degrees by the inverting amplifier 7 and becomes substantially the same signal Se as the before 1H delay. The difference between the input signal Sa and 1H delayed signal Se is taken by the subtracter 3 and output as a signal Sb. A signal Sc obtained by amplifying the difference signal Sb by the limiter amplifier, and the signal Sc 4 and limiting the amplitude is input into the other input terminal of the subtracter 2 through the switch 5. In the subtracter 2, the signal Sc is subtracted from the input signal Sa and the subtraction signal Sd is output to an output terminal 8 as an output. The switch 5 is controlled by a non-correlation detecting signal to be off only when there is no line correlativity in the vertical direction. In a luminance signal system, when the difference between the present luminance signal and 1H delayed luminance signal is taken and the difference signal amount is above a predetermined value, it will be judged that there is no correlation before and after 1H and the non-correlation detecting signal will be made by a pulse making means.

The operation shall be explained in the following. In case a continuous chroma signal having a line correlativity has a noise component, the input chroma signal Sa containing the noise component will be subtracted from the signal Se delayed by 1H by the 1H delaying circuit 6 and a signal Sb having only the noise component extracted will be obtained. When the noise component, reduced k times (k<1 wherein k is a gain) by the limiter amplifier, is subtracted from the input chroma signal Sa containing the noise component, a chroma signal Sd having the noise component removed will be output to an output terminal 7. In case a continuous chroma signal having a line correlativity has no noise component, Sa=Se and, as Sc=0, the output Sd will not be different from the input Sa.

Here, such step response that a chroma signal of an amplitude A is present until a horizontal line but is no longer present from the next line shall be considered. The gain k of the limiter amplifier 4 represents a recursive coefficient and is set to be $0<k<1$.

First of all, the gain k of the limiter amplifier 4 is assumed to be k=0.5 and the operation in case the amplitude A of the input chroma signal Sa is below the limiter level L of the limiter amplifier 4 shall be explained with reference to FIG. 5. At this time, the switch 5 will remain on.

Sa represents a step-like chroma signal introduced into the input terminal 1 and Se represents a signal when the signal Sa is delayed by 1H by the 1H delaying circuit 6 through the subtracter 2 and is inverted in the phase by 180 degrees by the inverting amplifier 5. Sb represents a difference signal between the signals Se and Sa in the subtracter 3 and Sd represents a difference signal between the input signal Sa and a signal Sc when the signal Sb is suppressed by the limiter amplifier 4.

While the chroma signal Sa introduced into the input terminal 1 is of a fixed value A, Sc=0 and then, in the 1H period when the chroma signal is no longer present, Sa=0 and Se will still remain to be of the amplitude A and, on the basis of the output Sc=−kA of the limiter amplifier 4, the output Sd=kA will remain. Further, in the next 1H period, as Sa=0 and Se=kA, the output Sd=k2A and will be thus multiplied by k in turn to be attenuated. This is shown to tail the fluctuation suppression and to be effective to the noise suppression. That is to say, the limiter amplifier 4 is provided to limit the tailing amount.

The operation in case the level of the input chroma signal Sa is made to be more than twice as high as the limit level L of the limiter amplifier 4 and the gain k of the limiter amplifier 4 is made k=0.5 shall be explained in the following with reference to FIG. 6. The switch 5 shall remain on.

While the chroma signal Sa introduced into the input terminal 1 is of a fixed value A, Sc=0, in the 1H period when the color signal is no longer present, Sa=0, Se will still remain to be of the amplitude A, will be multiplied by k by the limiter amplifier 4 and will be suppressed to the L value of the limit level, the output signal Sc will become Sc=L and will be subtracted from the signal Sa and the output signal Sd=L will remain. In the next 1H period, Sd=kL and then Sd will be multiplied by k in turn to be attenuated.

Here, in the 1H period when the chroma signal is no longer present, in case a non-correlation detecting signal switches off the switch 5, Sc=0 will be able to be made, the output Sd=0 as shown by the dotted line in FIG. 6 and the tailing of the chroma will be able to be eliminated.

However, the problem is that it is very difficult to emit a non-correlation detecting signal most properly. In the case of controlling a chroma signal, it will be generally practiced to obtain a non-correlation detecting signal from a luminance signal but often it will not coincide with the variation of the chroma signal.

As described above, there has been a problem that the method of using a switch at the time of a non-correlation in order to reduce the tailing in case the variation of a large amplitude signal level is large requires a non-correlation detector for its control and will be properly operate in many cases.

SUMMARY OF THE INVENTION

An object of the present invention is to provide a recursive comb filter making it possible to most properly reduce the tailing caused by the variation of a large signal amplitude without using a switch for controlling a non-correlation.

That is to say, a recursive comb filter by the present invention comprises:

a first subtracting means having as one subtracting input a periodic signal of a fixed period fed as an input;

a delaying means for delaying the output of this first subtracting means by the period of said periodic signal;

a second subtracting means for taking the difference between this delaying signal and said periodic input signal;

a first signal processing means for processing to amplify with an amplifying gain smaller than 1 the output from this second subtracting means and to limit the amplitude;

a second signal processing means having an amplifying gain smaller than the amplifying gain of this first signal processing means and processing to amplify the output from said second subtracting means;

a third subtracting means for subtracting the output of said second signal processing means from the output of said first signal processing means and feeding the subtraction output as the other subtraction input of said first subtracter; and means for leading out the output of said first subtracting means as a filter output.

In the present invention, in case the input signal is a minute signal smaller than the limit level of the first signal processing means, the difference in the amplification gain of the first and second signal processing means will become a subtraction coefficient and will operate to suppress the fluctuation (noise) the same as in the conventional technique and, when the level of the signal amplitude variation becomes so large as to be above the limit level of the first signal processing means, the attenuation amount from the input signal will decrease. Further, when the signal amplitude variation is so large that the level contracted in the gain in the second signal processing means exceeds the maximum output level, if the output levels of the first and second signal processing means at this time are the same, the attenuation amount from the input signal will be substantially zero. Therefore, the tailing by a large signal amplitude variation can be totally decreased.

DETAILED DESCRIPTION OF THE PREFERRED EMBODIMENTS

Figure 1:
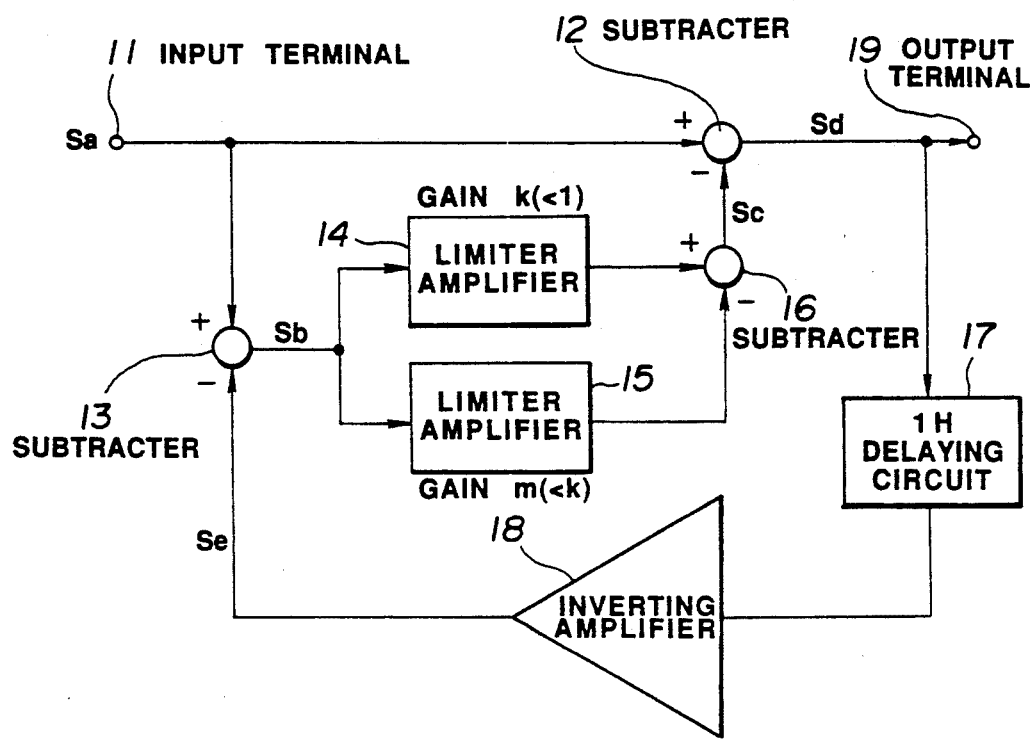
FIG. 1 is a block diagram showing a recursive comb filter embodying the present invention.
Figure 4:
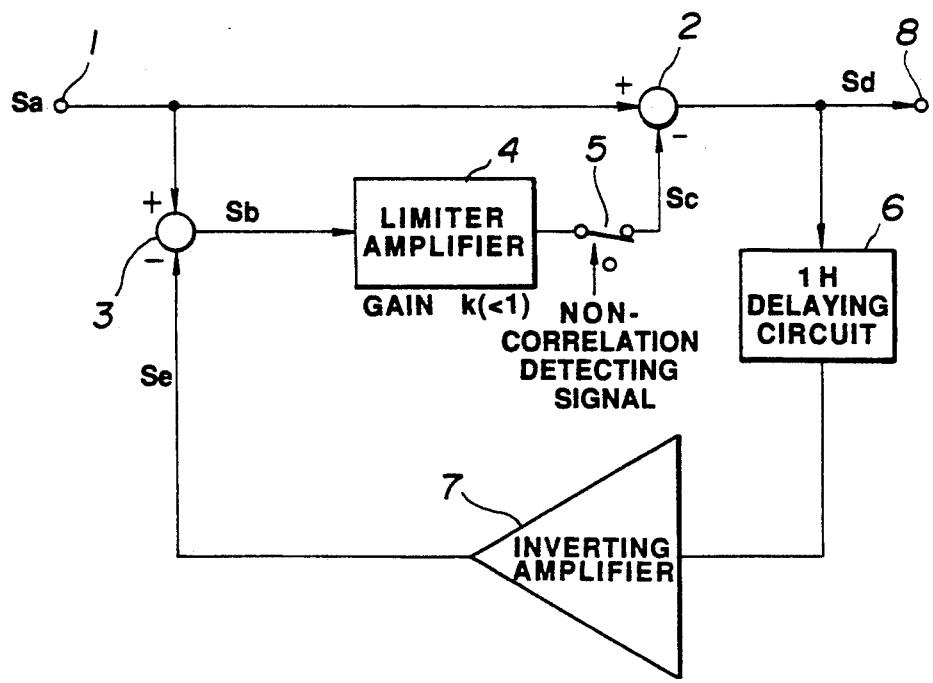
FIG. 4 is a block diagram showing a conventional recursive comb filter.

FIG. 1 is a block diagram showing a recursive comb filter embodying the present invention. A limiter amplifier 14 forms a first signal processing circuit and a limiter amplifier 15 forms a second signal processing circuit. That is to say, the second signal processing circuit is set so that its amplification gain coefficient may be smaller than that of the first signal processing circuit and the maximum output level may be equal to the amplitude limiting output level of the first signal processing circuit and can be naturally formed of an amplifier but is here made a limiter amplifier.

In FIG. 1, a chroma signal Sa is input into an input terminal 11 and this chroma signal input is output through a subtracter 12. This output Sd is led out to an output terminal 19 and also passes through a 1H delaying circuit 17 and inverting amplifier 18 to become signal Se. The difference between the input signal Sa and 1H delayed signal Se is taken by subtractor 13 to extract a non-correlative component Sb which is input into the limiter amplifiers 14 and 15. Thus, input terminal 11, subtractor 12, delaying circuit 17, inverting amplifier 18 and subtractor 13 cooperate to act as a non-correlative component extracting circuit. The output of the limiter amplifier 15 subtracted from the output of the limiter amplifier 14 by the subtracter 16 and if fed back as a signal Sc to the above mentioned subtracter 12. The gain of the limiter amplifier 14 is represented by k and the limit level of the output is represented by L. When the gain of the limiter amplifier 15 is represented by m, it will be set to be considerably smaller than k. Therefore, the limiter amplifier 15 will be strong in the character of a linear amplifier. A limiter amplifier 15 is subjected to an amplitude limit for a large amplitude input exceeding its limit level and its maximum amplitude limit output level is made L the same as, for example, the limiter amplifier 14.

Figure 2:
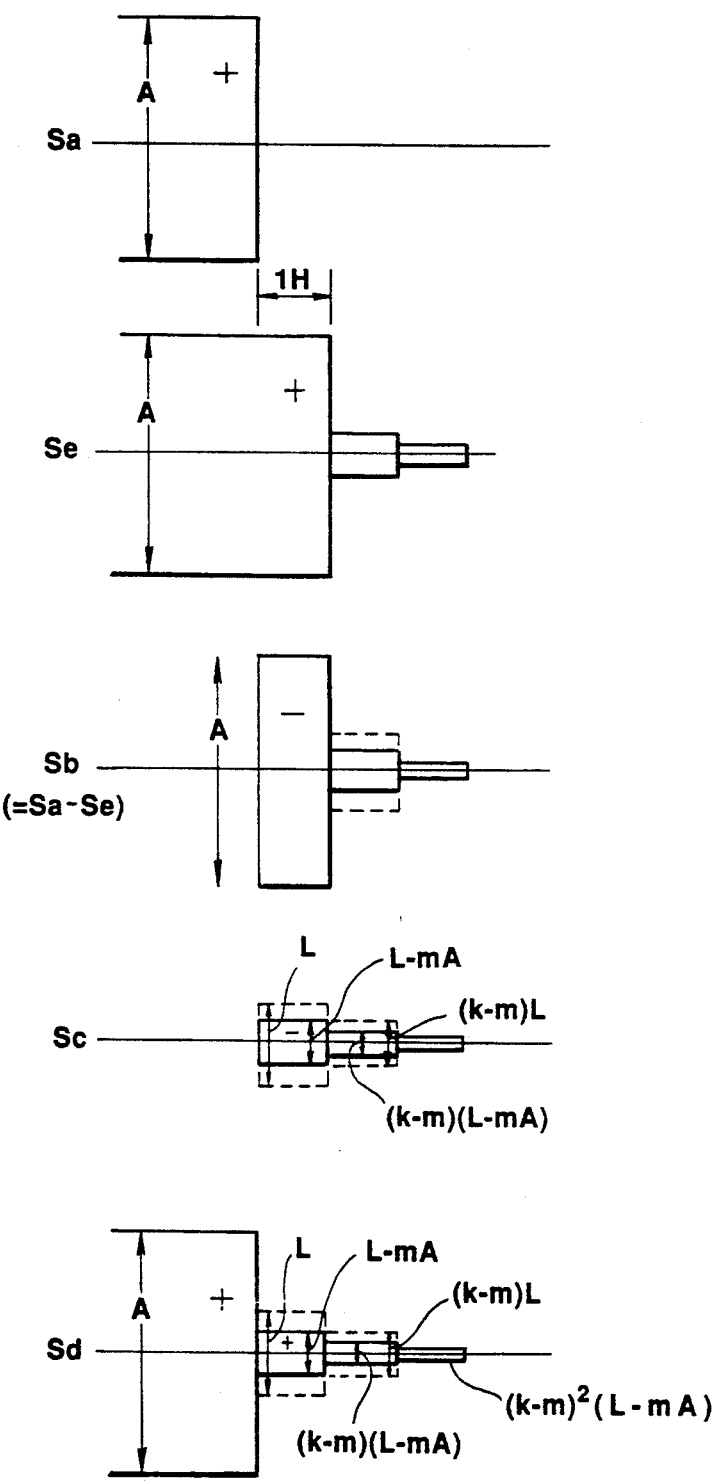
FIG. 2 is an explanatory view for explaining the operation in FIG. 1.
Figure 3:
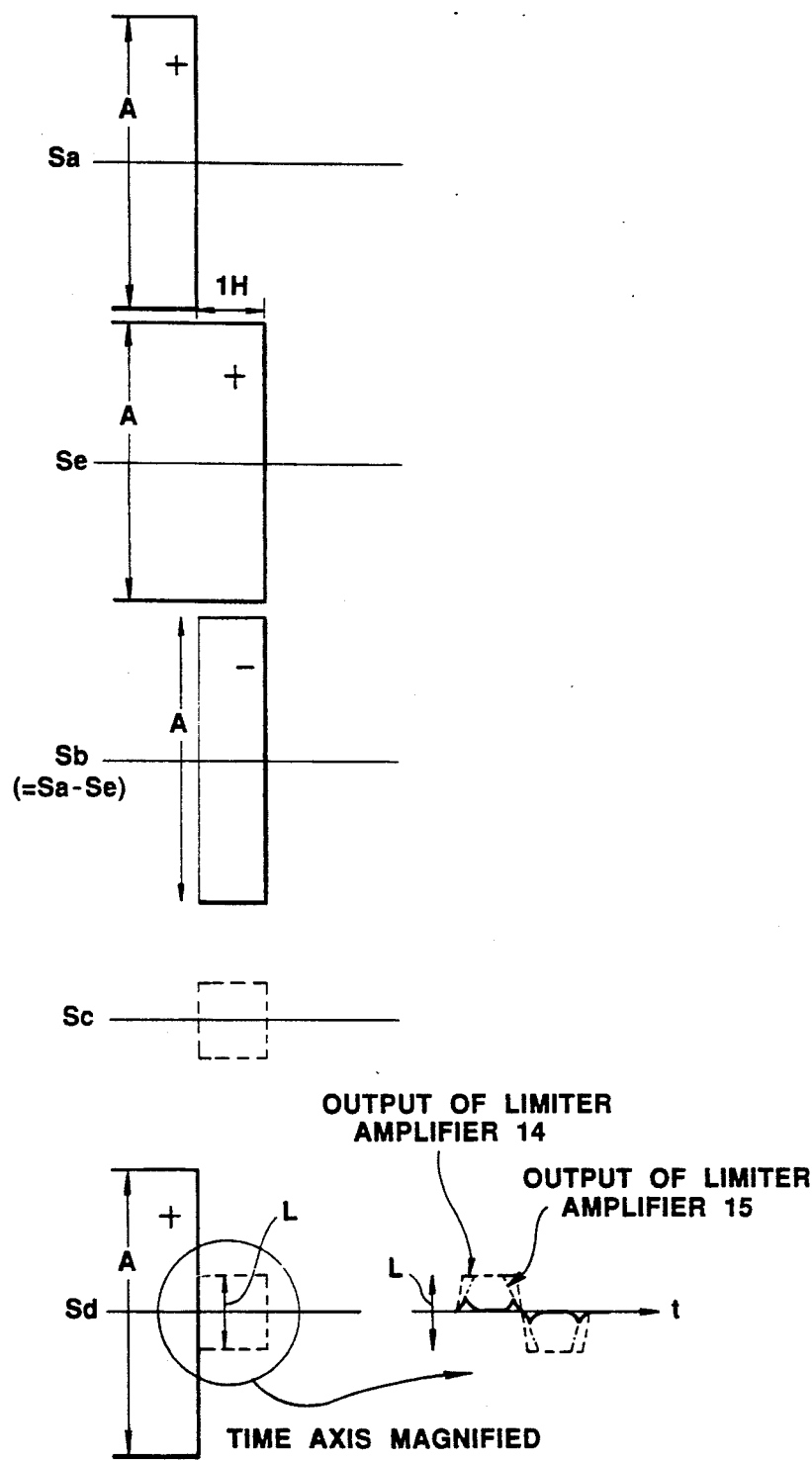
FIG. 3 is an explanatory view for explaining the operation in FIG. 1.
Figure 5:
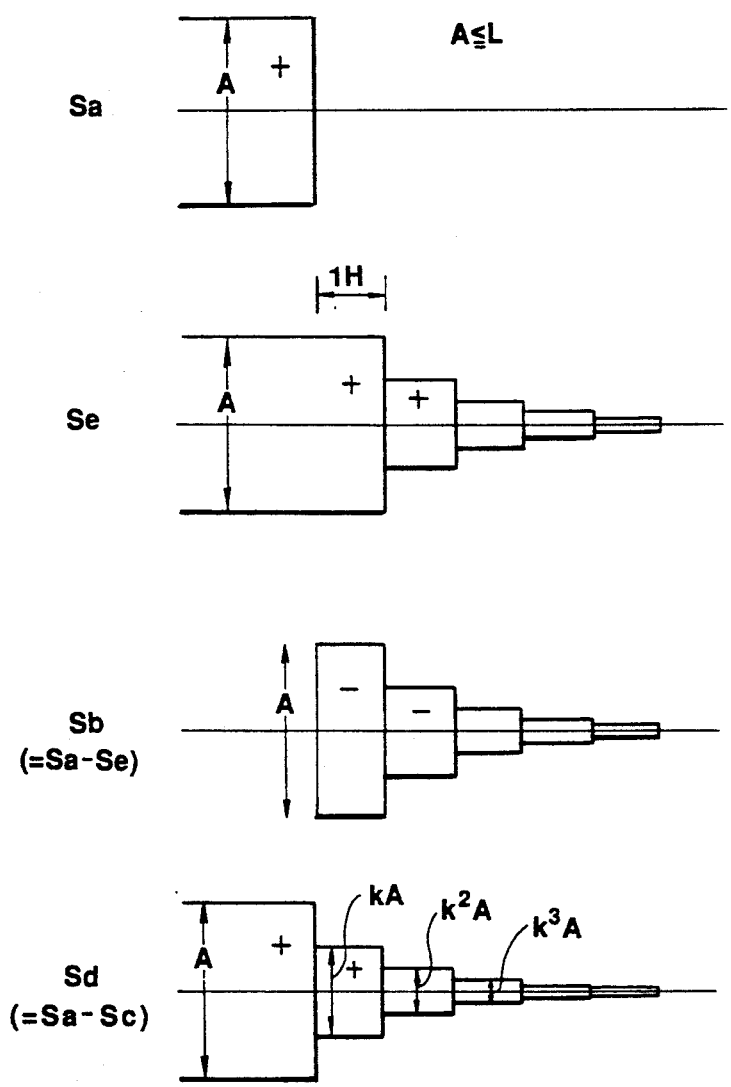
FIG. 5 is an explanatory view for explaining the operation in FIG. 4.
Figure 6:
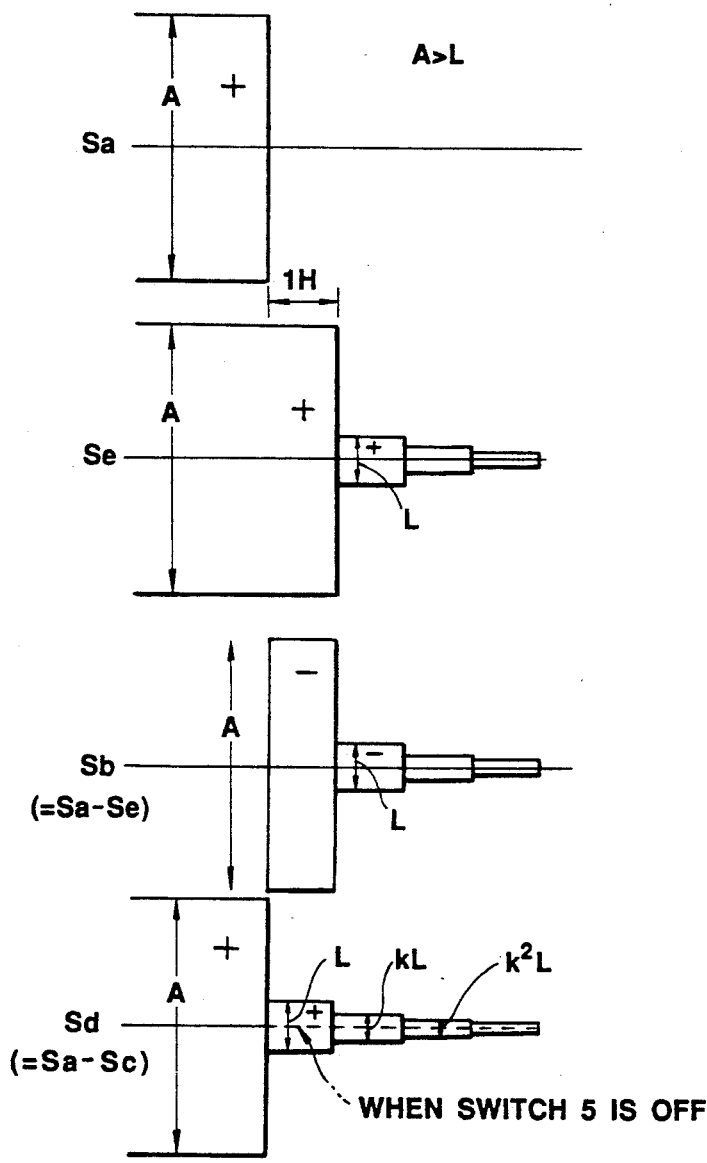
FIG. 6 is an explanatory view for explaining the operation in FIG. 4.

The operation shall be explained in the following with reference to FIGS. 2 and 3.

The pattern of the input signal shall be a step response that the chroma signal Sa become 0 after some lines from a chroma signal of an amplitude of a fixed value A.

First of all, in case the level of the input signal fed to the input terminal 11 is a signal so minute that the limit is not applied by the limiter amplifiers 14 and 15, the subtraction signal Sc to the output will be Sa-Se as multiplied by $(k-m)$. Therefore, the recursive coefficient will be $(k-m)$. If it is set to be of the same as the value of the conventional k, it will be exactly the same as the conventional technique. In the drawing, $k-m=0.5$.

The case that the level of the input signal is a medium amplitude shall be explained in the following with reference to FIG. 2. In FIG. 2, as the input signal exceeds the limit level of the limiter amplifier 14, the output of the limiter amplifier 14 is limited but, in the limiter amplifier 15, the gain is smaller than that of the amplifier 14 and does not exceed the limit level and therefore the output is not limited and becomes a linear operation. In the 1H period when no chroma signal is present, as $Sa=0$ and $Se=A$, $Sa-Se=-A$. The output of the limiter amplifier 14 is fixed with L but the output of the limiter amplifier 15 is proportional to A and is mA. At this time, the output is represented by $Sd=-Sc=L-mA$.

Thereafter, this is multiplied in turn by (k−m) to be attenuated. Thus, the larger the fluctuation of the amplitude A, the smaller the later tailing.

The case that the level of the input signal is a large amplitude shall be explained in the following with reference to FIG. 3. In FIG. 3 is shown the case that the input signal is of such large amplitude that the input signal limited by both limiter amplifiers 14 and 15. The signals Sa, Se, Sb, Sc and Sd in FIG. 3 correspond respectively to those in FIG. 2. In this case, as both outputs of the limiter amplifiers 14 and 15 are L and are fixed, the output Sc of the subtracter 16 will be 0, Sd will be also 0 and the tailing will be substantially zero. Needless to say, strictly speaking, as shown in the magnified view of Sd in FIG. 3, the difference (shown by the solid line) in the linear region will remain by the part of the difference in the gain between the limiter amplifiers 14 and 15 but will not be such problem. That is to say, the difference output shown by the solid line in the magnified view is a difference part between the amplifiers 14 and 15 and is contracted to be (k−m) (as m is considerably smaller than k, k−m≈k) times as large and therefore, as compared with the tailing shown by the dotted line when there is no subtraction by the limiter amplifier 15, the tailing shown by the solid line may be said to be substantially nil.

As described above, according to the present invention, without using anon-correlation controlling switch as in the conventional technique, the tailing by the variation of a large signal amplitude can be eliminated. Also, as the tailing is suppressed in response to the variation amount of a signal amplitude, a more natural picture will be made.

In the above mentioned embodiment, the case that the input is a chroma signal has been explained. However, the present invention can be utilized also in the case of a luminance signal input but, in such case, the inverting amplifier 18 is not required.

The present invention is not limited to only the above mentioned embodiment but various modifications can be made without deviating from the subject matter of the invention.

What is claimed is:

1. A recursive comb filter comprising:
   first subtracting means, having first and second inputs, for inputting a periodic signal of a fixed period at the first input and outputting a first subtracted signal;
   means for delaying the first subtracted signal by the period of said periodic signal and outputting a delayed signal;
   second subtracting means for subtracting the delayed signal from the periodic signal and outputting a second subtracted signal;
   first means for amplifying, by an amplification factor smaller than 1, the second subtracted signal to provide an amplified signal and limiting the amplitude of the amplified signal to provide a limited amplified signal;
   second means for amplifying the second subtracted signal by an amplification factor smaller than that of the first amplifying means and outputting a second amplified signal;
   third subtracting means for subtracting the second amplified signal from the first amplified signal to provide a third subtracted signal to the second input of the first subtracting means, the first subtracting means first subtracting the third subtracted signal from the periodic signal to produce the first subtracted signal; and
   means for outputting the subtracted signal as a filter output signal.

2. A recursive comb filter according to claim 1, wherein the first amplifying and limiting means limits the amplitude of the amplified signal to cause the amplitude of the limited amplified signal to be substantially equal to a maximum amplitude of the second amplified signal.

3. A recursive comb filter according to claim 1, wherein:
   said periodic input signal is a chroma signal inverted in phase in each horizontal period thereof; and
   said means for delaying comprises:
      a delaying circuit for delaying the first subtracted signal by one horizontal period to provide a delayed chroma signal; and
      an inverting circuit for inverting the delayed first subtracted signal to produce the delayed signal.

4. A recursive comb filter according to claim 1, wherein said periodic input signal is a luminance signal of one horizontal period.

5. A recursive comb filter comprising:
   non-correlative component extracting means for inputting a periodic signal having a fixed period, delaying the periodic signal to provide a delayed periodic signal, and subtracting the delayed periodic signal from the periodic signal to extract a non-correlative component;
   first means for amplifying the non-correlative component by an amplification factor smaller than 1 to provide an amplified signal and for limiting the amplitude of the amplified signal;
   second means for amplifying the non-correlative component by an amplification factor smaller than the amplification factor of the first amplifying means to provide a second amplified signal; and
   means for subtracting the second amplified signal from the first amplified signal to provide a subtraction signal and for subtracting the subtraction signal from the periodic input signal to provide a filter output signal.

* * * * *